(12) United States Patent
Remillet

(10) Patent No.: US 10,929,849 B2
(45) Date of Patent: Feb. 23, 2021

(54) METHOD AND A SYSTEM FOR PERFORMING 3D-BASED IDENTITY VERIFICATION OF INDIVIDUALS WITH MOBILE DEVICES

(71) Applicant: Christophe Remillet, Lausanne (CH)

(72) Inventor: Christophe Remillet, Lausanne (CH)

(73) Assignee: OneVisage SA, Lausanne (CH)

( * ) Notice: Subject to any disclaimer, the term of this patent is extended or adjusted under 35 U.S.C. 154(b) by 965 days.

(21) Appl. No.: 15/030,837

(22) PCT Filed: Oct. 24, 2014

(86) PCT No.: PCT/IB2014/002226
§ 371 (c)(1),
(2) Date: Apr. 20, 2016

(87) PCT Pub. No.: WO2015/059559
PCT Pub. Date: Apr. 30, 2015

(65) Prior Publication Data
US 2016/0253675 A1 Sep. 1, 2016

(30) Foreign Application Priority Data
Oct. 25, 2013 (CH) ........................... 1801/13

(51) Int. Cl.
*G06Q 20/40* (2012.01)
*G06F 21/31* (2013.01)
(Continued)

(52) U.S. Cl.
CPC ....... *G06Q 20/40145* (2013.01); *G06F 21/31* (2013.01); *G06K 9/00214* (2013.01);
(Continued)

(58) Field of Classification Search
CPC ........... G06K 9/00288; G06K 9/00906; G06K 9/2027; G06K 9/00268; G06K 9/4661;
(Continued)

(56) References Cited

U.S. PATENT DOCUMENTS

2002/0012454 A1 1/2002 Liu et al.
2004/0218070 A1 11/2004 Hamalainen
(Continued)

FOREIGN PATENT DOCUMENTS

EP 2515497 A1 10/2012
EP 2515500 A1 10/2012
(Continued)

OTHER PUBLICATIONS

International Search Report and Written Opinion for PCT/IB2014/002226, dated Jan. 21, 2015, 8 pages.

*Primary Examiner* — Sonji N Johnson
(74) *Attorney, Agent, or Firm* — Blank Rome LLP

(57) ABSTRACT

A method for verifying the identity of an individual with a mobile device equipped with at least one camera, a graphical display, a wireless communication adapter, and a verification mobile application. The method includes capturing a video of a biometric attribute of the individual through said camera of mobile device (step 120). Then reconstructing with the mobile device in real-time a 3D model of the individual's biometric attribute from the video captured, where the 3D model contains shapes and/or textures, forming thereby a reconstructed 3D model (step 120). And, comparing the reconstructed 3D model with a reference 3D model containing shapes and textures, stored in either the mobile device or remote enrolment database following a previous enrolment phase of the individual with said mobile device, thereby providing a detailed comparison result.

19 Claims, 9 Drawing Sheets

(51) Int. Cl.
   *G06T 7/579*      (2017.01)
   *G06K 9/00*       (2006.01)
   *G06T 15/04*      (2011.01)
   *G06T 17/20*      (2006.01)
   *H04N 5/77*       (2006.01)
   *H04N 7/18*       (2006.01)

(52) U.S. Cl.
   CPC ..... *G06K 9/00892* (2013.01); *G06K 9/00899* (2013.01); *G06T 7/579* (2017.01); *G06T 15/04* (2013.01); *G06T 17/20* (2013.01); *H04N 5/77* (2013.01); *H04N 7/181* (2013.01); *G06T 2207/30201* (2013.01); *G06T 2215/16* (2013.01)

(58) Field of Classification Search
   CPC ............. G06K 9/0061; G06K 9/00281; G06K 9/00885; G06K 9/52; G06K 9/00248; G06K 9/00214; G06K 9/00892; G06K 9/00899; G06Q 20/40145; G06F 21/31; G06F 21/32; G06T 7/579; G06T 15/04; G06T 17/20; G06T 2207/30201; G06T 2215/16; H04N 5/77; H04N 7/181
   See application file for complete search history.

(56) References Cited

U.S. PATENT DOCUMENTS

| | | |
|---|---|---|
| 2008/0212848 A1 | 9/2008 | Doyle |
| 2012/0140993 A1 | 6/2012 | Bruso et al. |
| 2013/0086674 A1 | 4/2013 | Horvitz et al. |
| 2013/0235045 A1* | 9/2013 | Corazza .................. G06T 13/40 345/473 |
| 2015/0347734 A1* | 12/2015 | Beigi ..................... G06F 21/32 713/155 |

FOREIGN PATENT DOCUMENTS

| | | |
|---|---|---|
| WO | WO-2009/070660 A1 | 6/2009 |
| WO | WO-2010/073171 A2 | 7/2010 |
| WO | WO-2013/022375 A1 | 2/2013 |
| WO | WO-2013/063048 A1 | 5/2013 |

\* cited by examiner

Figure 1
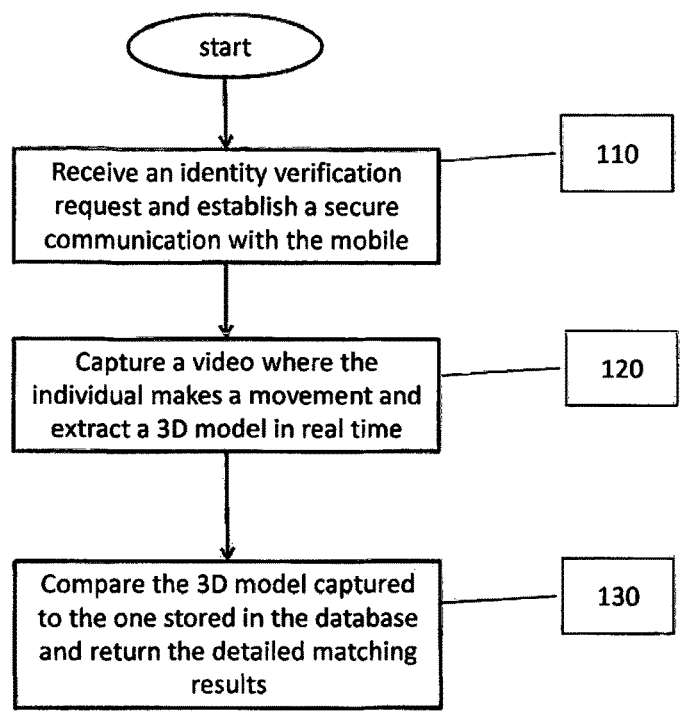
Figure 2.A
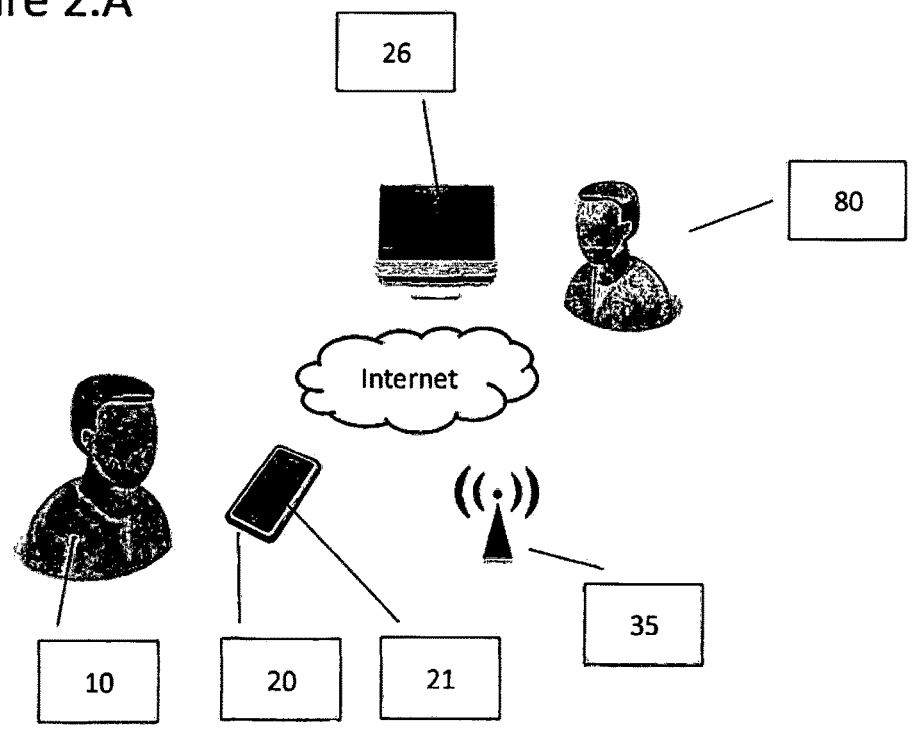

Figure 2.B
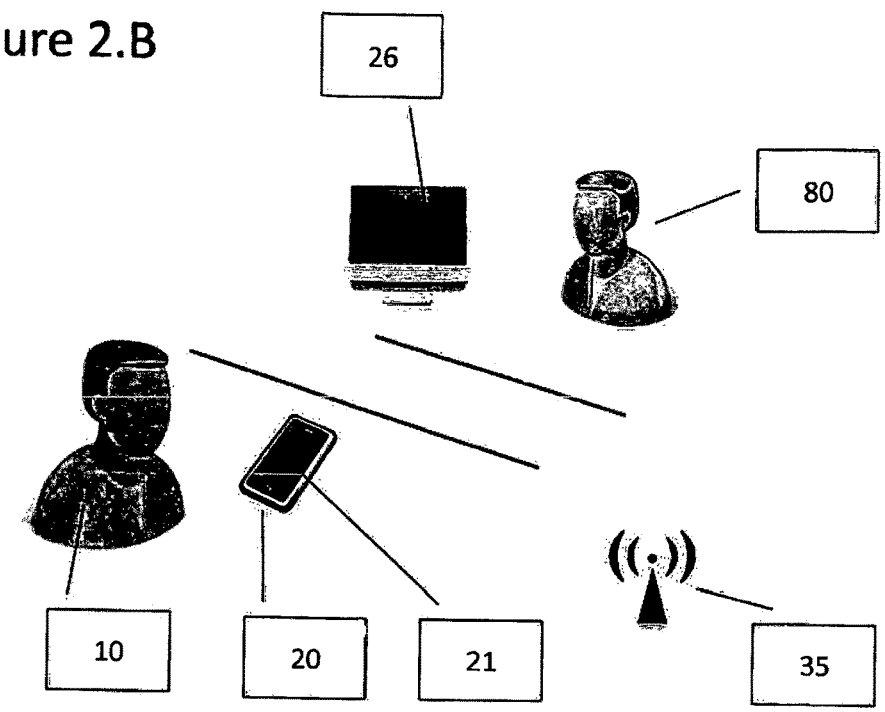
Figure 2.C
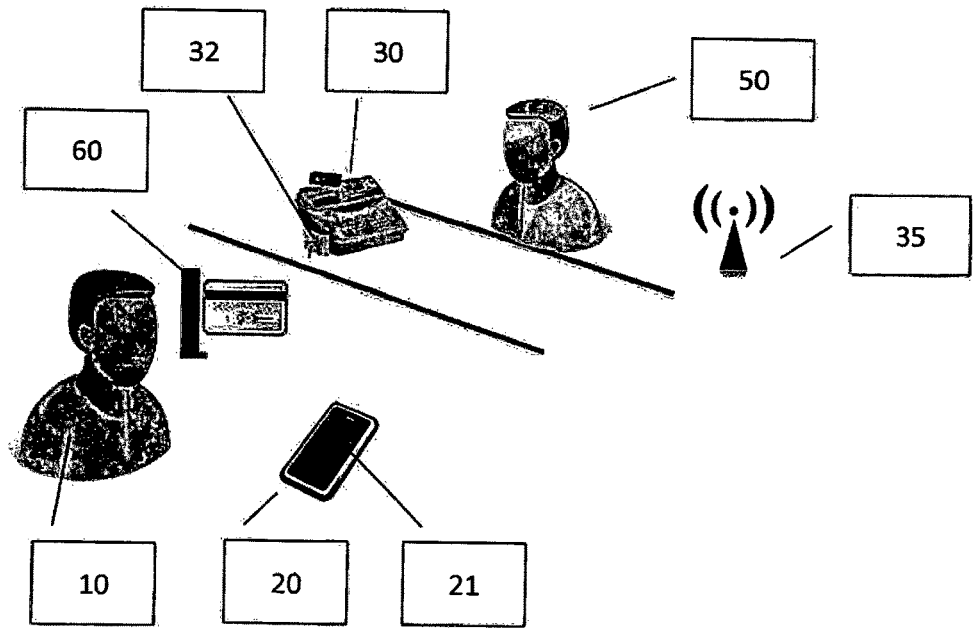

Figure 2.D
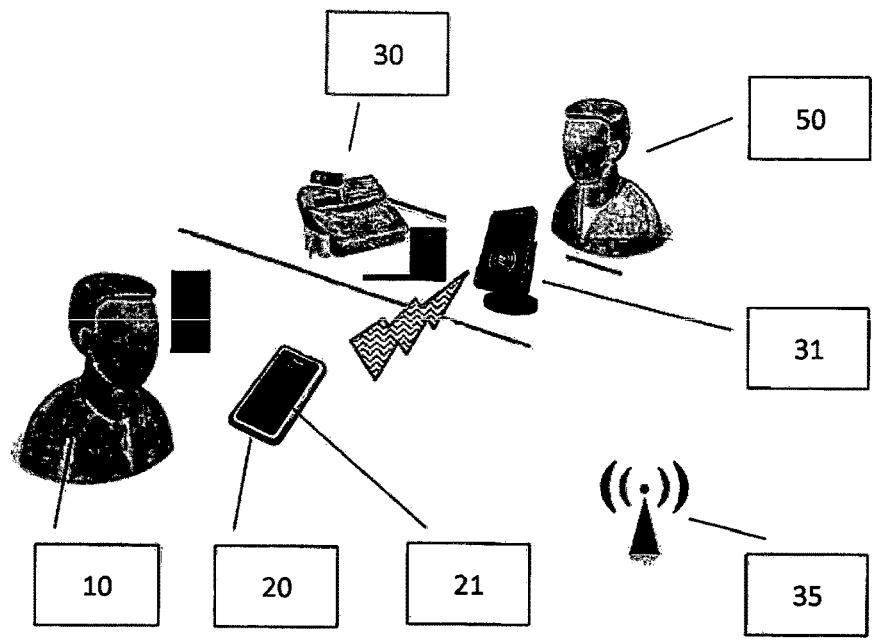
Figure 2.E
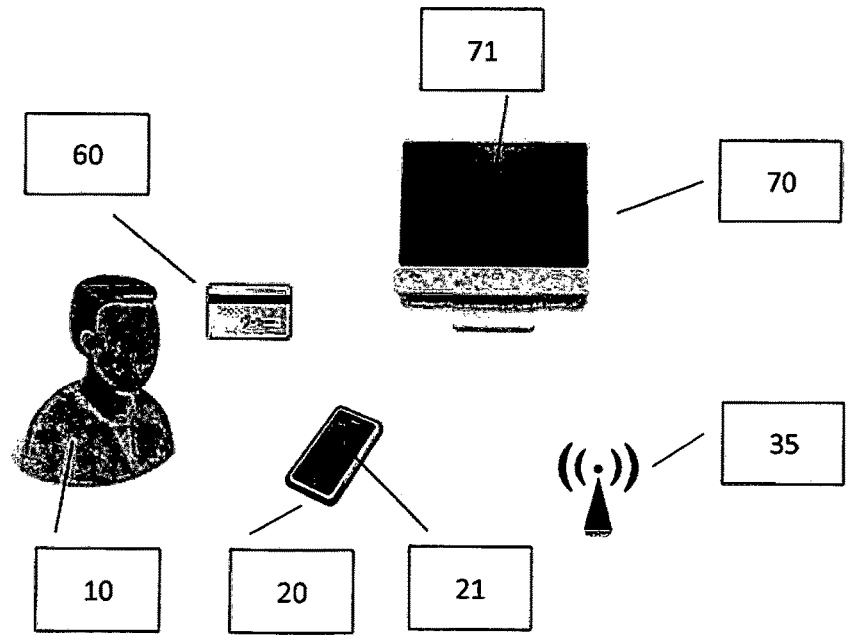

Figure 2.F
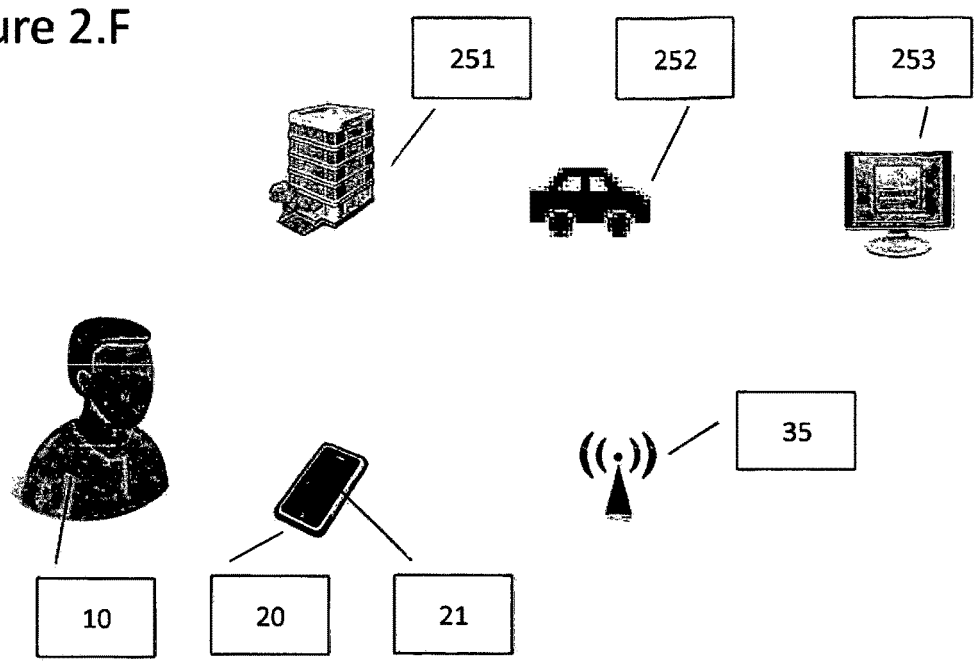
Figure 3
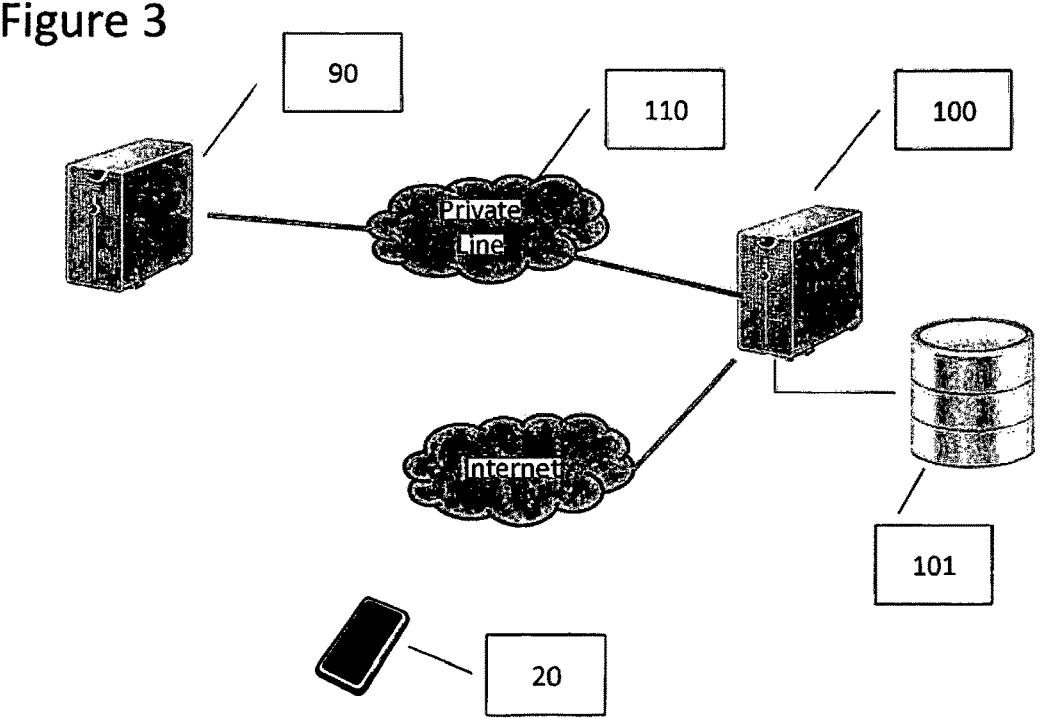

Figure 4.A
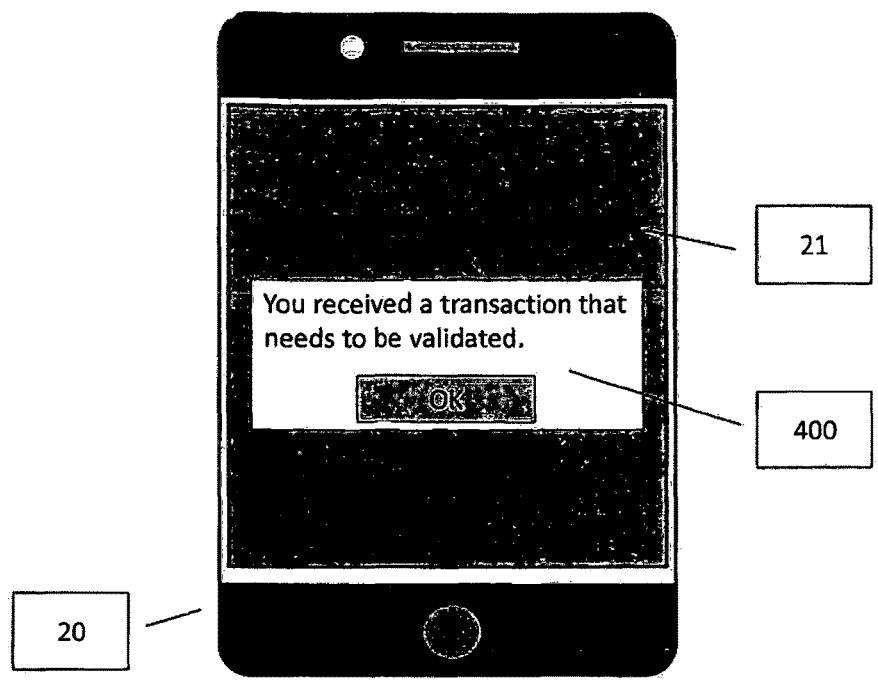
Figure 4.B
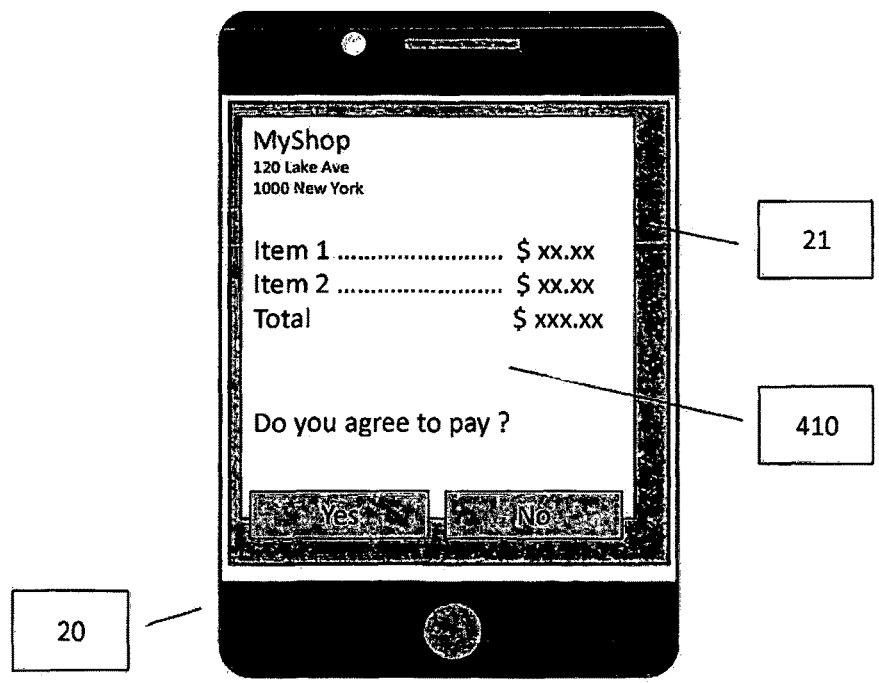

Figure 4.C
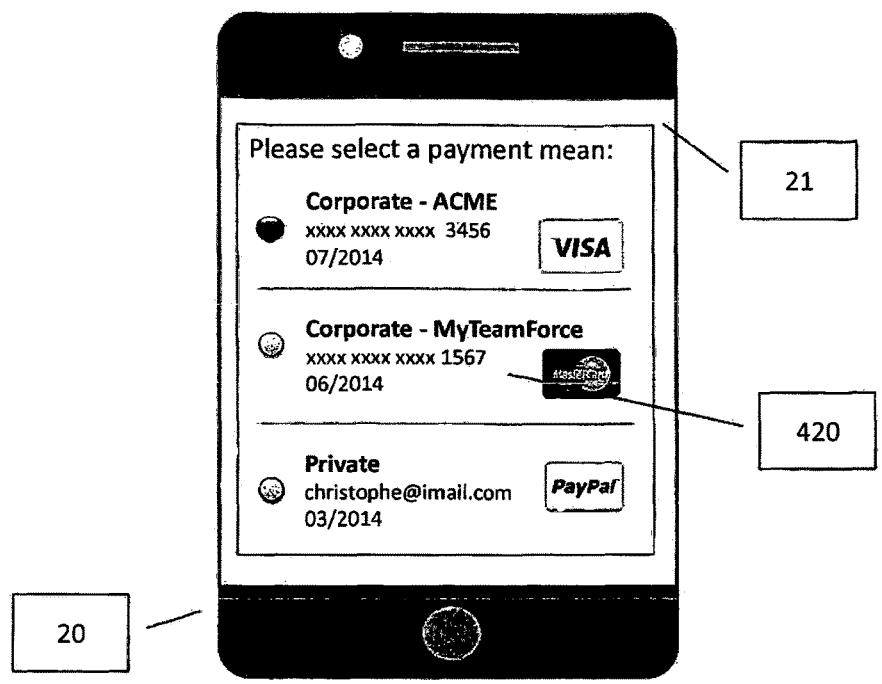
Figure 4.D
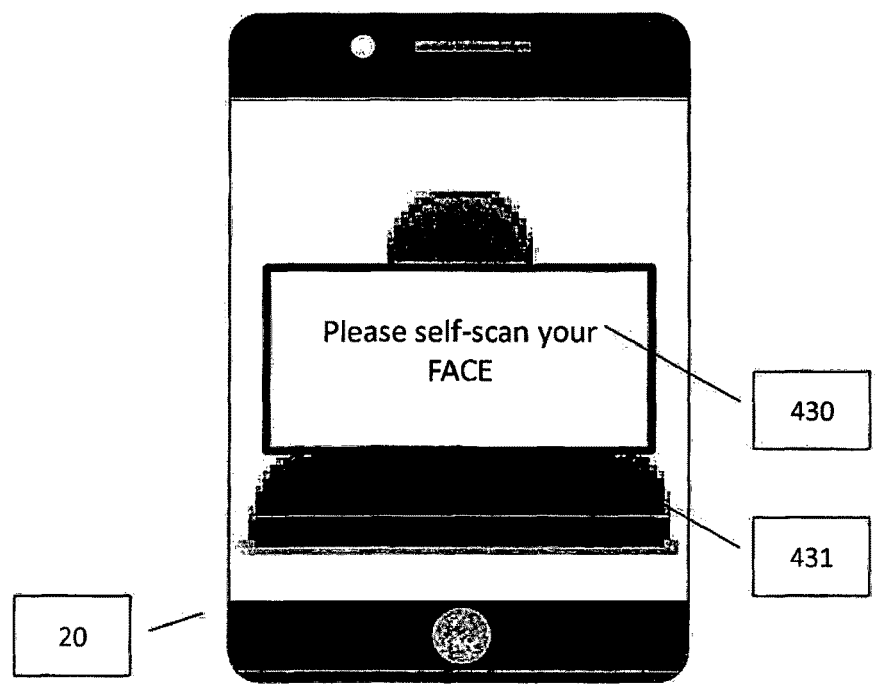

Figure 4.E
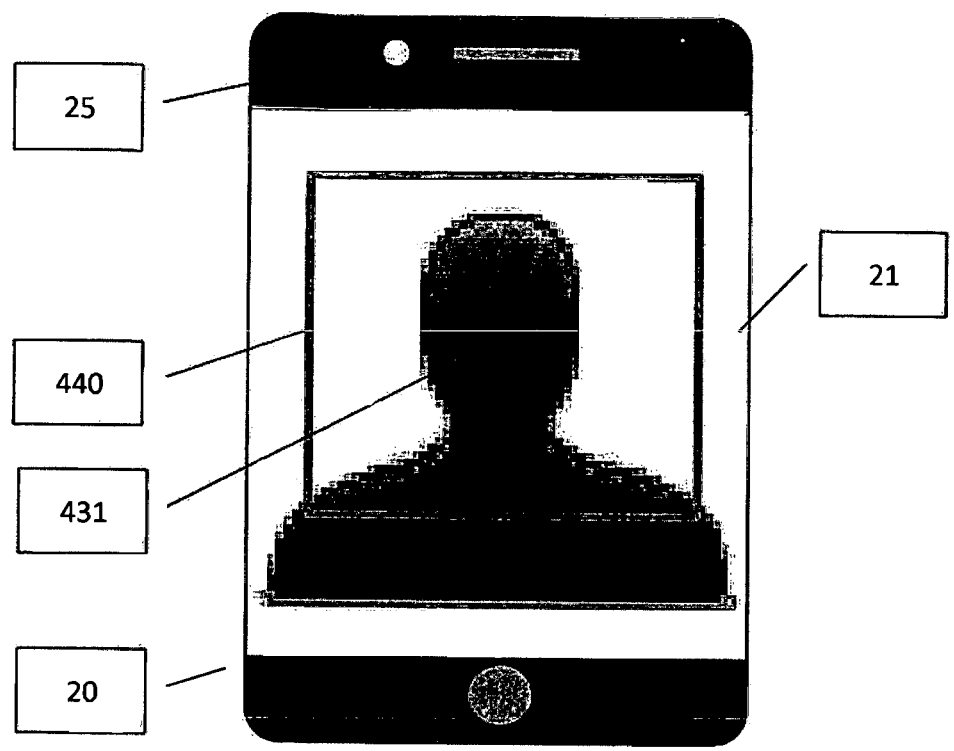
Figure 4.F
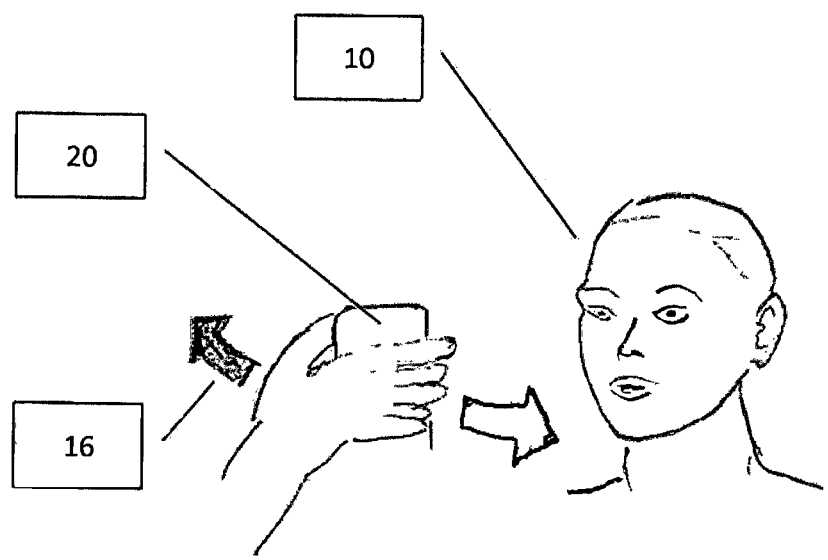

Figure 4.G
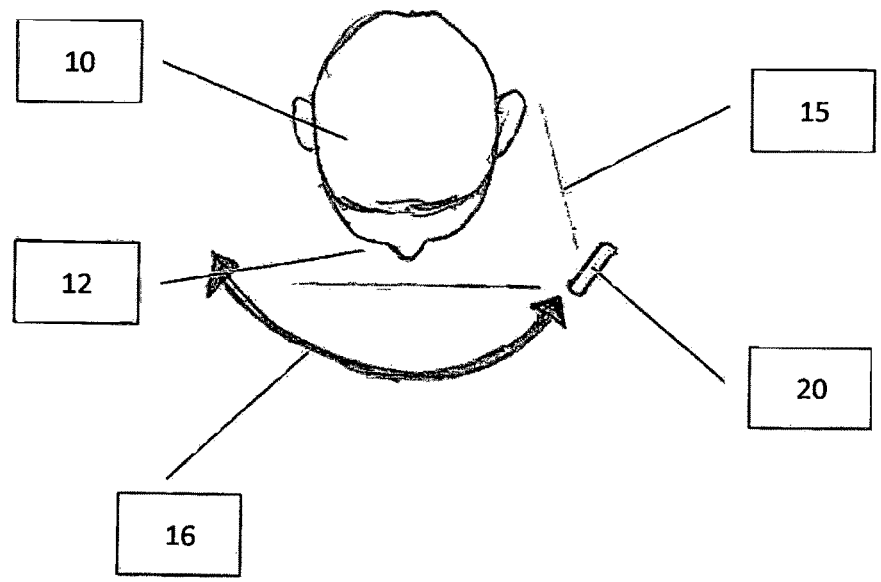
Figure 4.H
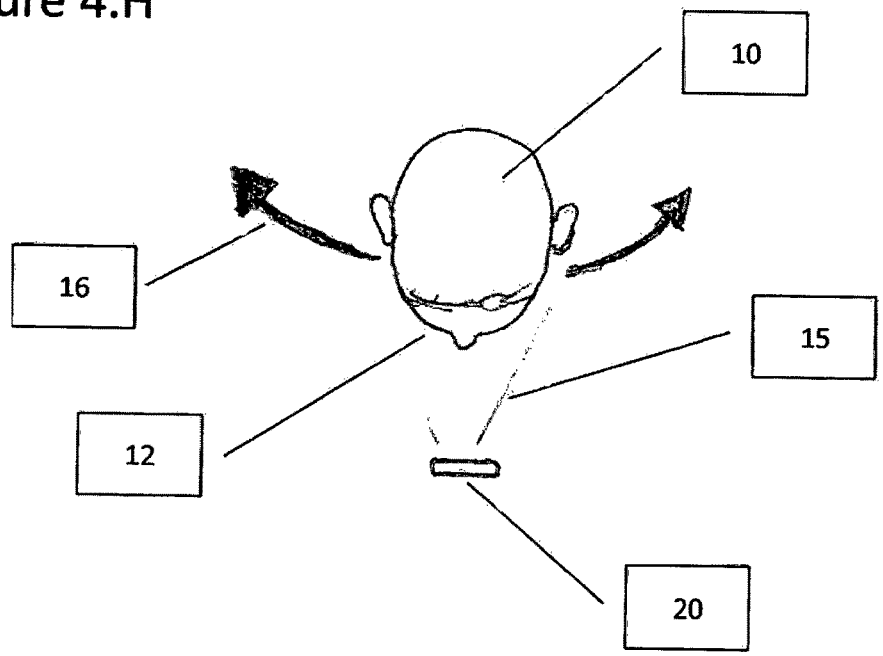

Figure 4.1
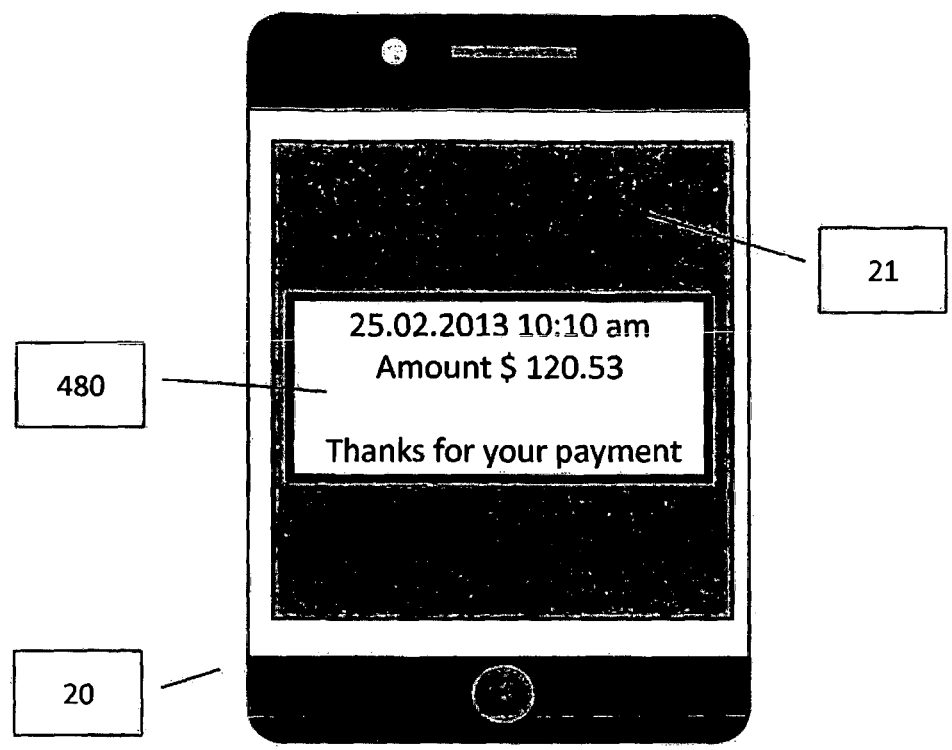

METHOD AND A SYSTEM FOR PERFORMING 3D-BASED IDENTITY VERIFICATION OF INDIVIDUALS WITH MOBILE DEVICES

RELATED APPLICATIONS

This application is a national phase of PCT/IB2014/002226, filed on Oct. 24, 2014, which claims the benefit of Swiss Application No. CH01801/13, filed on Oct. 25, 2013. The entire contents of those applications are incorporated herein by reference.

Referring to patent WO 2013/063048, "Mobile, wireless handheld biometric capture, processing and communication system and method for biometric identification", issued to Mullin et al., this patent illustrates a way to run an individual biometric scan such as a face or iris scan by using a wireless handheld device. However, the patent requires a specific biometric processing and communication system which is piggybacked to the regular wireless handheld device.

FIELD OF THE INVENTION

The invention relates to an innovative method, system and apparatus to verify the identity of an individual using a regular mobile device, such as an Android's smartphone, iPhone or iPad (registered trademarks), or more generally any mobile device the individual owns or is authorized to use, equipped with a built-in camera, graphical display and wireless communication adapter.

DESCRIPTION OF RELATED ART

There has been an explosion of applications and digital services during the last decade, where both consumer and corporate markets have driven the adoption of mobile/wireless communication handheld devices such as Android, iOS, BlackBerry (registered trademarks) smartphones and tablets and the like. However, despite all these services provide great values to end-users, there is a growing concern about security and more particularly about identity theft.

More precisely, various applications and services rely on prompting the end-user to enter a user id and password for authentication purposes. In regards of the many hacking techniques which have been developed, it is now fairly understood the user id & password paradigm is not secure anymore.

As a consequence, there is a huge demand in the market to find out a secure way to protect digital transactions, services or any kind of digital accesses where data must be kept confidential. Logically, the industry has put an important effort to develop biometric solutions, including fingerprint, iris or face scan. In the current art, biometric techniques are still very expensive and difficult to roll-out at a large scale, mainly due to the fact they require specific installations and/or scan procedures. As an example, there are many 3D scan solutions out there using fixed cameras used to reconstitute a 3D model.

One biometric technology which has a particular focus of the invention, involves a visual scan of the individual's attribute such as the face by using the individual's wireless handheld device (hereinafter mobile device).

Referring to patent WO 2013/06304, "Mobile, wireless handheld biometric capture, processing and communication system and method for biometric identification", issued to Mullin et al., this patent illustrates a way to run an individual biometric scan such as a face or iris scan by using a wireless handheld device. However, the patent requires a specific biometric processing and communication system which is piggybacked to the regular wireless handheld device.

Pat. No. US20080212848, entitled "Using biometrics on pervasive devices for mobile identification", issued to Doyle et al, discloses a method and apparatus using a pervasive device such as a cellular phone or handheld device used to identify third-parties. However, a biometric device requires to be connected to or incorporated within the pervasive device.

Pat. No WO2013063048, entitled "Mobile, wireless handheld biometric capture, processing and communication system and method for biometric identification", issued to Mullin et al. discloses a biometric capture device, associated software and processes which enable a commercially available wireless communication device, such as a smartphone, using a commercially established wireless communication networks to capture a digital image of a human biometric (iris, fingerprint, etc.) for transmission via a secure connection to a central server. However, the patent requires a specific biometric capture device which is piggybacked to the mobile device.

Pat. No WO2013022375, entitled "Portable mobile communication device with identification on the basis of user's biometric parameters", issued to Bilyukin et al., discloses a model which includes a portable mobile communication device which comprises a keyboard and is equipped with means for reading a user's biometric parameters and a means for setting an identification code. However, the patent doesn't teach us how to provide a mechanism for individual's verification without requiring a biometric reader.

Pat. No WO2009070660, entitled "Integration of facial recognition into cross channel authentication", issued to Newman, Banerjee, Bendel et al, discloses an interesting method and apparatus taking real time images to identify an individual who is entering a bank facility. However, the patent requires a setup made of a fixed camera in the bank facility and doesn't provide a solution to verify the identity of the individual by using a regular mobile device.

Pat. No US20120140993, entitled "Secure biometric authentication from an insecure device", issued to Bruso et al., discloses a method to authenticate a user based on a two steps authentication procedure, where a first biometric information request is handled followed by an action challenge request used to augment the authentication accuracy result. However, the patent doesn't teach us how to perform a single authentication sequence and how to deliver very high authentication performance/accuracy.

Pat. No US20130086674, entitled "Multi-frame depth image information identification", issued to Horvitz et al. discloses a method which uses depth information captured from a video. However, the method and system require the use of a depth camera where each image contains depth information, such specific and expensive camera being unavailable in almost all mobile devices. The method doesn't teach us a methodology to extract a 3D model, from a video or sequence of 2D images using a regular mobile device. Furthermore, the method disclosed may require a second authentication challenge procedure like making a specific gesture to augment the authentication accuracy.

Pat. No EP2515500, entitled "Method and mobile station for sequential biometric authentication", issued to Blessing et al., discloses a method to authenticate a user by initiating a phone call and capturing one or a sequence of images when the user is moving the mobile around his ear. However the method requires a phone call to execute the authentication sequence and is limited to scan the individual's head only.

Therefore, it is desirable to develop a new method to verify the identity of individuals which can be adopted at a large scale, use regular mobile devices without any need for a specific hardware, comes with a very low setup cost, delivers very high performance and accuracy results, allows free scanning gestures with six degrees of freedom and provides a plurality of biometric attributes the individual can select to respect his privacy and confidentiality.

BRIEF SUMMARY OF THE INVENTION

According to the invention, these aims are achieved by means of the verification method claimed, the system for verifying the identity of an individual, as claimed, and the method for protecting a transaction for an originator transaction service by implementing a biometric recognition of an individual through his personal mobile device, as claimed.

The present invention discloses a fundamental method and system in identity verification of individuals through mobile devices (more generally available wireless handheld devices), such as mobile phone, by comprising the steps of:

a) enrolling the individual in the identity verification system under the supervision of an authority or a duly authorized agent (the enrolment agent), namely implementing an enrolment phase. Upon the identity's check by the enrolment agent and if the individual is eligible to use the identity verification service, the enrolment agent will send out an activation code to the individual's mobile device, by a message such as a SMS for example. This will allow the individual to activate the verification mobile application and finalize the enrolment procedure which consists in:

selecting one or more biometric attributes the individual agrees to use for identity verification such as the face, left hand, right hand, left foot, right foot, left ear and/or right ear for each selected biometric attribute, i. capturing a video where the individual is either panning the mobile device around the biometric attribute or making a movement with the corresponding limb in front of the mobile camera, ii. reconstructing from the video captured a 3D model in real time with shapes and textures (or alternatively only with shapes or alternatively only with textures) of the biometric attribute, iii. storing the 3D model reconstructed in either the identity verification system database or the individual's mobile for further identity verification purposes.

Once the biometric attribute 3D models are recorded in the identity verification system database, the individual is ready to use the identity verification service and make secure transactions of any kind, like making a credit card payment or accessing a building b) implementing an identity verification phase when the identity verification server receives a verification request from the originator transaction service like a banking service and comprising the steps of:

checking if the verification mobile application is available/awoken and establishing a secure communication session between the verification mobile application and the identity verification server receiving a transaction request in the verification mobile application and informing the individual about the transaction, in case of a financial transaction, selecting a mean of payment when a plurality of payment means have been subscribed by the individual, self-scanning a biometric attribute accordingly to a determined direction and more generally accordingly to a determined movement, both biometric attribute and movement being preferably randomly selected by the identity verification server. For example, the individual will be prompted to pan his face from left to right, reconstructing in real time a 3D model from the video captured by the individual's mobile device, the model containing a plurality of shapes and textures which uniquely characterize the individual, comparing the 3D model captured to the one recorded in the database or the individual's mobile device during the enrolment step. In a preferred embodiment, the 3D models comparison is made by the identity verification server returning the 3D model comparison results to the originator transaction service, which, depending on the nature of the transaction, accept to process, reject it or do a second identity verification sequence selecting another or same biometric attribute among the list selected by the individual.

Such a method allows to implement rapidly, after an initial enrolment phase, with the only use of a personal and standard mobile device such as a smartphone, and with a good biometric authentication performance/accuracy, secured transactions of any kind. Also, such a method can be used not only using face recognition, but also with other limb recognition which multiplicity of biometric attributes allows on one side to respect the privacy of the individual and also on the other side to make several identity verification of the individual through recognition of several biometric attributes, reinforcing thereby the security level of the authentication. Moreover, due to the use of shapes and/or textures of the biometric attribute, either globally or locally through sub-attributes, such a method provides a very reliable authentication method.

In the method according to the invention, the individual uses a standard mobile device like a smartphone or tablet which captures a video with the built-in camera and reconstructs a 3D model of a biometric attribute like the face or left hand and compares the obtained 3D model to the one stored in a database or in the individual's mobile during a previous enrolment phase.

BRIEF DESCRIPTION OF THE DRAWINGS

The invention will be better understood with the aid of the description of an embodiment given by way of example and illustrated by the figures, in which:

FIG. 1 is a flow chart illustrating an exemplary method for verifying the identity of an individual according to one embodiment of the invention FIG. 2.A is a schematic diagram illustrating an individual remotely enrolling to the identity verification service under the supervision of an enrolment agent FIG. 2.B is a schematic diagram illustrating an individual enrolling to the identity verification service, having a face to face appointment with the enrolment agent FIG. 2.0 is a schematic diagram illustrating the individual purchasing items in a shop and paying with a payment card FIG. 2.D is a schematic diagram illustrating the individual purchasing items in a shop, tagging his mobile device to a near field communication (NFC) reader to execute the payment FIG. 2.E is a schematic diagram illustrating the individual shopping on-line and paying with a payment card FIG. 2.F is a schematic diagram illustrating the individual in various secure access situations like accessing a secured building, a web site or a car FIG. 3 illustrates a schematic deployment diagram of the identity verification system according to one embodiment of the invention FIG. 4.A illustrates a sample screen where the individual receives a transaction verification request notification FIG. 4.B illustrates a sample screen where the individual is prompted to confirm a purchase transaction FIG. 4.C illustrates a sample screen where the individual is prompted to select a mean of payment FIG. 4.D illustrates a sample screen where the individual is prompted to pan his face with his mobile device FIG. 4.E illustrates a sample screen which start capturing a video of the individual's face FIG. 4.F illustrates a sample panning movement around the face by the individual FIG. 4.G illustrates a top-down perspective where the individual is panning his face from left to right when capturing a video FIG. 4.H illustrates a top-down perspective where the individual is moving his head from left to right or from right to left when capturing a video FIG. 4.I illustrates a sample screen informing the individual the financial transaction has been executed upon identity verification success

DETAILED DESCRIPTION OF POSSIBLE EMBODIMENTS OF THE INVENTION

Many biometric authentication technologies and methods have been developed. However, various identification methods using mobile devices are complex to implement and hold back any massive adoptions due to cost reasons, specific hardware required on mobile devices like depth cameras, difficulties to reproduce some specific gestures and, most important, low authentication performance/accuracy which discourages or blocks individuals to use their own mobile device for making secured transactions of any kind. With the method according to the invention, such a biometric authentication is possible, for example with a standard RGB format used for the data (videos and/or 3D models).

FIG. 1 is a flow chart illustrating an exemplary method for verifying the identity of an individual according to one embodiment of the invention and which comprises the step of:

step 110: receiving an identity verification request by an originator transaction service (for example, a payment service provider) and establishing a secure communication between the mobile device 20 and the identity verification server, step 120: capturing a video with the mobile device 20 where the individual is making a pan movement around his biometric attribute 12 like the face and reconstructing with the mobile device 20 a 3D model in real time from the video, forming thereby a reconstructed 3D model, and step 130: comparing the reconstructed 3D model with the 3D model(s) recorded in either the identity verification server database or the individual's mobile, including potentially a SIM card or any other secured hardware and returning a comprehensive and detailed comparison result to the originator transaction service which then takes the decision to execute or not the transaction.

Referring to FIG. 2.A, is shown the enrolment phase of the individual 10 to the identity verification service through the originator service issuer. For example, the originator service issuer can be a bank or a digital payment service provider where the individual 10 wants to subscribe to the identity verification service described herein or where the individual 10 wants to upgrade to the identity verification service described herein. In the well know enrolment art, the individual 10 sends or fulfils a form to register. The enrolment authority or agent 80 processes the individual enrolment request and contacts the individual 10 to enroll, by making a phone call for example. The enrolment agent 80 checks the identity of the individual 10 in accordance with the enrolment organization procedures and processes defined like checking the passport or ID card.

Upon the manual identity verification by the enrolment agent 80, in a preferred embodiment, the individual 10 loads the verification mobile application 21 from an application store on his mobile device 20 by connecting through a wireless connection 35 such as a Wifi connection.

At this point, the verification mobile application 21 is deactivated and, depending on the originator transaction service issuer, either the individual 10 sends a request to the identity verification service through the verification mobile application 21 or the enrolment agent 80 sends out an activation code to the individual 10, by sending an SMS or any other type of message in a preferred embodiment. Upon the validation of the activation code, a secure communication path between the verification mobile application 21 and the identity verification service is established.

The individual 10 then selects in the verification mobile application 21 which biometric attributes 12 can be used for identity verification purposes such as the face, left hand, right hand, left arm, right arm, left foot, right foot, left ear and/or right ear, indicating the preferred order. For example, the individual can indicate the face as first choice, left hand as second choice and right ear as third choice. In a preferred embodiment, the originator transaction service provider can use the individual's biometric attribute prioritized list to make additional identity verification checks. For example, if a financial transaction exceeds a certain amount, the originator transaction service may automatically prompt the individual 10 to make another self-scan with the second biometric attribute. It can be also the case the originator transaction service imposes a plurality of biometric attributes 12 to be scanned to execute a transaction.

Once the prioritized list of biometric attributes 12 has been made and saved in the identity verification service, the individual 10 is invited to pan the first biometric attribute with his mobile device 20 as being displayed by the verification mobile application 21. For example, the verification mobile application 21 screen of the individual's mobile device 20 displays "PLEASE SELF-SCAN YOUR FACE" as shown by message 430 in FIG. 4.D when the first biometric attribute 12 is the face as illustrated in FIGS. 4.F to 4.H.

If the biometric attribute 12 selected is the face or is a head-related attribute like the left ear, the verification mobile application 21 selects the front camera 25 of the mobile device 20 to capture a video (See FIG. 4.E). Otherwise, the verification mobile application 21 activates the rear camera to take a video.

Once the verification mobile application 21 has activated the camera, in a preferred embodiment, a thin frame 440 is displayed on the mobile screen to assist the individual 10 in adjusting the distance between the camera 25 and the biometric attribute 12. Audio messages or sounds may be played as well by the verification mobile application 21 to assist the individual to adjust the distance between the mobile and his body part or in case of inappropriate conditions like placing the (front or rear) camera 25 in front of the sun. For example, a frame 440 coloured in green might be used to indicate that the distance between the face as biometric attribute 12 and the mobile device camera 25 is good enough as shown in FIG. 4.E.

Referring to FIGS. 4.F, 4.G and 4.H, the individual 10 then executes the self-scanning movement 16, where the individual 10 can either make a panning movement 16 with the mobile device 20 around his biometric attribute 12 shown as being the face. As shown in FIGS. 4.G and 4.F the panning movement 16 with the mobile device 16 is a horizontal panning movement. Alternatively, the panning movement 16 is done by the biometric attribute 12 of the individual 10 in front of the mobile device 20 as shown in FIG. 4.H for an horizontal panning movement of the head (from left to right or from right to left or both). Alternatively the panning movement 16 is done both by the mobile device 20 and by the individual 10 which make possible any mix combinations of both movements. In one embodiment, a specific movement direction like "from left to right" can be imposed by the identity verification server 100.

As facial expression during enrolment or during identity verification can have a direct impact on the comparison results between the 3D models, it is possible to have an enrolment phase with two scans of the face, one with a closed mouth and another with a smiling face so that these two extreme mouth positions allow to bring the 3D model back to a neutral facial expression by an adapted software.

During the self-scanning movement, in a preferred embodiment, a 3D model or partial 3D model is constructed in real time by the verification mobile application 21 from the video captured by the mobile device 20, which preferably takes into account the solid angle 15 of the camera 25, which depends from the lens diaphragm opening and the focal length of the camera, in order to optimize the bandwidth of the connection established between the mobile device 20 and the identity verification server 100.

However, other embodiments are possible in order to balance the security requirements, connection bandwidth and mobile device CPU limitations. For example, in one embodiment where the mobile device CPU performances are fairly limited, a partial 3D model with shapes only can be constructed and sent to the identity verification server 100 with the video sequence. In such case, the facial textures will be constructed by the identity verification server 100 by analysing the video sequence.

As a first variant of the enrolment phase, only the shape of the biometric sub-attributes and/or non-biometric sub-attributes is considered for establishment of reference 3D model of all sub-attributes of the considered attribute. As a second variant of the enrolment phase, only the texture of the biometric sub-attributes and/or non-biometric sub-attributes is considered for establishment of reference 3D model of all sub-attributes of the considered attribute. As a third and preferred variant of the enrolment phase, both shape and the texture of the biometric sub-attributes and/or non-biometric sub-attributes are considered for establishment of reference 3D model of all sub-attributes of the considered attribute.

In the present text, "shape" means a 3D surface reconstruction of a body part namely at about one decimeter scale or lower scale (about one centimeter scale or several centimeter scale). The shape information is specific of some particularly distinctive portions of the biometric attributes of the individual 10, such as biometric sub-attributes (i.e. nose, cheeks, chin, lips, mouth, tiptoes, fingers, . . . ) or of objects worn by the individual 10, such as non-biometric sub-attributes (glasses, watches, rings, earrings, piercings, beads, bracelets, . . . ) and which may contribute to uniquely characterizes the individual.

Also, in the present text, "texture" means a 3D surface reconstruction of the skin corresponding to the scanned body part than can be of less extent than for shape, that preferably has a higher resolution and which contains also information about the colour, namely the contrast and/or the colour density difference between adjacent zones (density can also be defined as level of grey for a black and white image). The 3D surface of the texture is therefore a local 3D surface, with more detailed relief (hollows and protrusions) than the 3D surface of the shape, namely at about one millimeter scale or lower scale (about one hundred of micrometers scale or several hundreds of micrometers scale). The texture information is specific of some particularly distinctive signs of biometric sub-attributes, such as wrinkles or palm lines, skin grain, scars, beauty spots, freckles, birth marks, tattoos, eyes' iris, eyelids. Depending on the uniqueness of the skin texture of the individual, the texture can be interpreted as a unique set of distinctive signs of the skin and therefore of the individual's biometric attribute or sub-attribute. For example, if an individual has five hundred twenty freckles on his face, his 3D skin texture information, including 3D coordinates of these five hundred twenty freckles, can be used to assert his identity with a very high level of confidence. Skin texture therefore comprises information about the coordinates and/or color density and/or size of one sole or a group of skin elements, preferably of the same category among distinctive signs of biometric sub-attributes, this sole element or this group of elements being distinctive of the individual in the same way than an accurate map is distinctive of a geographical area. By extension, the texture can be applied on non-biometric attributes to provide a smart 3D representation of objects or portion(s) of an object worn by the individual. Therefore, thanks to this smart texture, which does not depend from the colorimetry, but takes into account the colour density variation with a monochromatic basis, the individual's recognition is safer and more efficient.

Referring to FIG. 3, a 3D model containing the shapes and textures of the biometric attribute 12 scanned is recorded in either the individual's mobile device or the identity verification server database 101 for further identity comparison purposes. As there are some regions of the face which are changing over the time or which may change, a restricted set of 3D textures will be reconstructed from the video where eyes, nose and lips regions will be used in a preferred embodiment as primary biometric sub-attributes. Depending on the person's gender, additional shapes and textures can be reconstructed like the women's chin which can be considered as a permanent biometric attribute.

In case the individual 10 has one or more tattoos and when applicable, the tattoos will be used as strong identification biometric sub-attribute which uniquely characterize the individual. This introduces the notion of additional primary criteria which are permanent objects wear by the individual 10 and where a 3D model can be reconstructed during the self-scan phase. In that case, the individual 10 can indicate a list of additional primary criteria during the enrolment process like piercings, beads, bracelets, rings, watches and so on.

Concerning the particular case of glasses as non-biometric sub-attribute, in a preferred embodiment, the method will propose the individual 10 to make a self-scan with each distinct pair of glasses the individual 10 is used to wear, in addition to a mandatory self-scan without any glasses. In another embodiment, the pairs of glasses can be also scanned with the verification mobile application 21 separately from the individual's face during the enrolment step and where the 3D model can be superimposed to the 3D face model to make a face comparison when the individual is wearing a pair of glasses during an identity verification request. Despite this process is taking one or two minutes more during the enrolment step, it will allow the individual 10 to make identity verification queries by wearing or not a pair of glasses, in a completely transparent and natural way.

If the individual 10 has decided to enable multiple biometric attributes 12 or if the originator transaction service provider is requesting to use multiple biometric attributes, a plurality of 3D models corresponding to all biometric attributes selected will be recorded in either the individual's mobile device or the identity verification server database 101. For example, if the face, left hand and right hand have been selected as biometric attributes that can be scanned during the enrolment step, the mobile device or the database will contain three 3D models.

Referring to figure A.3, finally, at least one 3D model is recorded in the individual's mobile device or database 101 and marked as reference data. Upon the termination of the 3D models recording, the identity verification server 26 generates a Unique Identity Verification Mobile number (UIVM) and sends the UIVM to:

i) the verification mobile application 21 which saves the UIVM number in an encrypted way on the mobile device 20. Once the UIVM code is activated, the verification mobile application 21 sends a presence status to the identity verification service, indicating the verification mobile application 21 is launched and ready.

ii) the originator transaction service 90 which saves the UIVM number in order to submit identification requests to the identity verification server 100.

This terminates the enrolment process of the individual 10. If the individual 10 wishes to subscribe to the identity verification server 100 with another mobile device, the enrolment procedure described beforehand must be repeated. Beside the fact the 3D model data may slightly differ due to significant differences of camera characteristics such as the optical lens or CCD resolution, therefore giving slightly different 3D models from one device to another, this method also prevents and limits hacking situations where a device is stolen and UIVM number would be reused.

If the individual 10 wants to subscribe to another originator transaction service like another credit card issuer, the identity verification service will first perform a UIVM check on the mobile device 20. If a UIVM exists on the mobile device 20, the identity verification service will void the individual to redo a self-scanning of his biometric attributes 12 which have been 3D modelled.

In FIG. 2.B, the individual 10 enrolls to the identity's verification service 100 through an in-person enrolment transaction between the individual 10 and the enrolment agent 80. The individual 10 and enrolment agent 80 execute the same enrolment process as described beforehand in FIG. 1.A, except that the enrolment agent 80 doesn't need to contact or call the individual 10.

FIGS. 2C through 2.E illustrate a few examples of identity verification situations.

FIG. 2C shows an in-person transaction between the individual 10 and the merchant 50 in a shop. The merchant 50 enters the items to be purchased in the cash register 30 or alike. The individual 10 introduces his payment card 60 in the card reader 32 which is connected to the cash register 30. The cash register 30 initiates a financial transaction request with the financial transaction server, or more generally the originator transaction service 90.

Referring to FIG. 3 and according to the well-known financial transaction art, the financial transaction server (originator transaction service 90) verifies the financial data (emitter, receiver and so on). The financial transaction server (originator transaction service 90) checks if the individual 10 subscribed to the identity verification service and sends an identity verification request to the identity verification server 100. As shown in Figure A.3, a secure connection is implemented between the originator transaction server 90 and the identity verification server 100, like a private communication line 110.

In a preferred embodiment, the identity verification request uses an individual/user alias or identifier which is mapped to one or a plurality of UIVM numbers stored in the identity verification database 101. Upon receiving the identity verification request, the identity verification server 100 retrieves the UIVM numbers corresponding to the individual/user alias from said identity verification database 101, checks which UIVM number has an available presence status and sends an identity verification request to the available mobile device(s) 20, which, upon receiving the request can automatically exit a sleep mode.

Referring to FIG. 4.A, the verification mobile application 21 receives an identity verification request 400.

Upon the acceptance of the identity verification request 400 by the individual 10, other active verification mobile applications running on other individual's mobile devices stop offering an identity verification request.

Referring to FIG. 4.B, the verification mobile application 21 displays the financial transaction information or data 410 as provided by the identity verification server 100 which relayed the information from the originator transaction service 90. Accordingly to the well-known transaction art, the individual 10 checks the financial transaction information 420 displayed and accepts to pay.

Referring to FIG. 4.C, in a preferred embodiment, the mobile verification application 21 optionally prompts the individual 10 to select a payment card or mean of payment among several choices shown as financial transaction information 420 on the verification mobile application 21, when a plurality of payment services have been subscribed by the individual 10.

Referring to FIG. 4.D, the verification mobile application 21 receives or has received the self-scanning instructions from the identity verification server 100. In a preferred embodiment, the verification mobile application 21 displays a schematic form 431 of the biometric attribute 12 that needs to be self-scanned like the face or left hand.

From that instant, as can be seen from FIG. 4.E, the mobile device camera 25 is activated and the mobile verification application 21 automatically attempts to auto-detect the biometric attribute 12 which is supposed to be self-scanned. If after a certain period of time, the verification mobile application 21 cannot self-detect the biometric attribute 12, the verification mobile application 21 notifies the verification application server 100 the self-scanning sequence failed. In such case, the identity verification server 100 informs the originator transaction service 90 the identity verification query failed.

Referring to FIG. 4.E, in case of successfully detecting the biometric attribute 12 to be scanned, in a preferred embodiment, a frame 440 is displayed around a schematic form of the biometric attribute 431 where, for example, the frame's colour can be changed to indicate if the distance between the camera and the biometric attribute 12 is correct or not. An audio message may also be played to assist the individual 10 in adjusting the right distance.

Referring to FIGS. 4.F, 4.G and 4.H, the individual 10 then makes a pan movement 16 around the biometric attribute 12 with the mobile device 20, where depending on the mobile device CPU performance characteristics and wireless connection bandwidth detected, the verification mobile application 21, in a preferred embodiment, automatically:

a) reconstructs a 3D model from the video captured by the camera 25, extracting the shapes and textures or a subset of shapes and textures of the scanned biometric attribute 12 and/or scanned biometric sub-attribute(s) and compare the 3D model captured to the 3D reference model stored in the individual's mobile device or b) reconstructs a 3D model from the video captured by the camera 25, extracting shapes and textures or a subset of shapes and textures of the scanned biometric attribute 12 and/or scanned biometric sub-attribute(s) and sends the 3D model to the identity verification server 100 with the entire video sequence or a set of selected video sequences, where the video sequences have been qualitatively pre-qualified in term of 3D model extraction and/or c) reconstructs a partial 3D model from the video captured, partially extracting shapes and/or textures or a subset of partial shapes and/or textures of the scanned biometric attribute 12 and/or scanned biometric sub-attribute(s) and sends the partial 3D model to the identity verification server 100 with the entire video sequence or a set of selected video frames, where the video sequences have been qualitatively pre-qualified in term of 3D model extraction and/or d) send the entire video sequence or a selected set of video sequences, where the video sequences have been qualitatively pre-qualified in term of 3D model extraction and/or e) send the entire video sequence in a raw format to the identity verification server 100, notably in case of serious mobile device CPU limitations.

The end of the scan process occurs when the biometric attribute 12 is no more detected and in any case after a certain period of time defined by the identity verification server 100. At the end of the scan process, the identity verification server 100 finalizes the 3D model construction if necessary, by terminating the extraction of the 3D shapes and textures from the pre-qualified video sequences or raw video sequence. In the meantime, either the identity verification mobile application or the identity verification server 100 verifies if spoofing attack situations are detected by determining evidence of liveness from the video sequences and by comparing video sequences at determined times (in a 3 dimension coordinates system) as it is impossible the individual took exactly identical video sequences at the same time during the self-scan phase. In addition, accordingly to the well-known mobile software development art, additional consistency checks like using mobile device geo-localization and/or accelerometer techniques can be performed. Also, a spoofing check is preferably implemented by using the captured raw video of said biometric attribute or some fragments of the captured raw video and determining if the same scanning video sequence occurred in previously captured video of the same biometric attribute, notably by detecting, in a preferred embodiment, if identical backgrounds, 3D shape referential coordinates, luminance and/or gestures occurred. Another spoofing check is preferably implemented in case of successful but suspicious matching during the comparison step between the reconstructed 3D model and the reference 3D model, by recording the variance of the reconstructed 3D model within a predetermined range of time, where the variance for each shape and/or texture is computed and compared to a predetermined maximum acceptable parameter's magnitude range defined by the verification system and optionally differently for the considered individual. For instance a spoofing situation is considered as detected if a variance equal or lower than 0.2% is detected for the nose shape within a two month period of time. More generally a spoofing situation is considered to be detected if said variance is zero or close to zero (less than 0.5%) as it is impossible for an individual to mimic exactly the same scanning movement in the same conditions. As an alternative or in addition to the previously described spoofing check, the variance is recorded and compared to a predetermined maximum acceptable parameter's magnitude range for (an)other obtained 3D individual biometric attribute(s) models and/or for 3D permanent object(s) model(s) belonging to the individual and worn by the individual as non-biometric sub-attributes and/or for 3D biometric attribute.

Preferably, when reconstructing with the mobile device in real time a 3D model from the video captured, such reconstructed 3D model contains at least one or a plurality of 3D shapes of the scanned biometric attribute and which are independent of the illumination conditions, and optionally one or a plurality of textures associated with said 3D shapes.

Preferably, the wireless connection bandwidth available at the beginning of the identity verification phase is measured, the mobile device CPU performance characteristics are determined, and a balanced CPU load and a communication bandwidth are automatically selected when reconstructing the 3D model and when sending to the identity verification server full or partial reconstructed 3D shapes and textures. Optionally a complete raw video and/or a selection of prequalified video sequences may be sent to the identity verification server which will allow to reconstruct the 3D shapes and textures or finalize the reconstruction of the 3D shapes and textures.

Upon the completion of the 3D model reconstruction and spoofing situations check, the identity verification mobile application or the identity verification server 100 compares the 3D model reconstructed and the one which has been recorded at enrolment in the identity verification database 101. In a preferred embodiment, in order to provide a comprehensive comparison result, the identity verification mobile application or the identity verification server 100 returns a plurality of detailed matching scores corresponding to the shape and/or texture of the reconstructed biometric sub-attributes and/or non-biometric sub-attributes. For example, in a preferred embodiment, if the face has been scanned as biometric attribute 12, the comparison result will contain a plurality of matching scores for the nose, eyes, chin, cheeks, lips and/or mouth, each including a rating score for the matching between shapes and/or a rating score for the matching between textures. As a first variant, only the shape of the biometric sub-attributes and/or non-biometric sub-attributes is considered for establishment of detailed matching scores of all sub-attributes of the considered attribute. As a second variant, only the texture of the biometric sub-attributes and/or non-biometric sub-attributes is considered for establishment of detailed matching scores of all sub-attributes of the considered attribute. As a third and preferred variant, both shape and the texture of the biometric sub-attributes and/or non-biometric sub-attributes are considered for establishment of detailed matching scores of all sub-attributes of the considered attribute.

Internally, the identity verification mobile application or the identity verification server 100 implements an adaptation technique which allows taking into account the changes of the individual's appearance over the time. In a preferred embodiment, the texture data collected during the last n identity verification requests are analysed to extract appearance change vectors, within a predefined reasonable range, that will be taken into account for further identity verifications. For the shapes, appearance change vectors are also generated. However, by nature, the shape data are less sensitive and, in a preferred embodiment, the identity verification mobile application or the identity verification server 100 is configured with lower tolerance parameters (rather than the texture data tolerance parameters) concerning the individual's changes over the time.

Preferably, during said verifying phase, there is a further step of constructing a set of 3D biometric sub attribute patterns from 3D biometric sub attribute patterns constructed during the enrolment phase, where this set of 3D biometric sub attribute patterns can be used to speed up the comparison step of shapes and/or textures between the reference 3D model and the reconstructed 3D model of a considered attribute. As an example, in a preferred embodiment, an appropriate software can construct 3D biometric sub attribute patterns and optimize the comparison time by selecting only patterns which offer a good quality and accuracy.

The identity verification server 100 or the identity verification mobile application through the identity verification server 100 returns the comparison result to the originator transaction server 90, which, depending on the nature of the transaction and the comprehensive comparison results, decides to accept the transaction, reject it or do, another identity verification sequence with a different biometric attribute to increase the accuracy level.

Finally, the originator transaction server 90 executes the transaction and, in accordance with the well-known transaction art, notifies the identity verification server 100 the transaction has been performed, sending the transaction execution details 480, which are then relayed to the verification mobile application 21 to inform the individual via his mobile device 20 as illustrated in FIG. 4.I.

FIG. 2.D illustrates another in-person transaction in a shop, where the individual 10 tags his mobile device 20 to a near field communication (NFC) reader 31. In that case, the mobile NFC data contain individual information such as the originator service alias like a bank alias or identifier and may contain additional information about the mobile device 20 itself.

FIG. 2.E illustrates an in-person transaction in a virtual shop through the web using a computer 70 and the webpage 71 of the shop, where the individual 10 uses his payment card information 60. In that case, the shop payment service initiates a financial transaction request with the financial transaction server, or more generally the originator transaction service 90, which sends an identity verification request 400 to the verification mobile application 21 of the individual's mobile device 20.

In situation described according to FIGS. 2.D, 2.E and 2.F, and other possible cases, the originator transaction server 90 then retrieves the user's data and initiates the transaction process. Like in the previous use case described beforehand, the originator transaction server 90 sends a verification request to the identity verification server 100, where the self-scanning and comparison steps are executed as described beforehand.

FIG. 2.F illustrates another field of application of the present invention where the individual's identity is verified to access any secured areas 251, cars 252 or web services 253.

REFERENCE NUMBERS USED ON THE FIGURES

10 Individual
12 Biometric attribute (Face)
15 Solid angle of the camera
16 self-scanning movement
20 Mobile device
21 verification mobile application
25 front camera
26 identity verification server
30 cash register
31 near field communication (NFC) reader
32 card reader
35 wireless connection
50 Merchant
60 payment card
70 Computer
71 webpage of the shop
80 enrolment authority or agent
90 originator transaction service, financial transaction server
100 identity verification server
101 identity verification server database or enrolment database
110 connection step between mobile device and identity verification service
120 Step of video capture and 3D model extraction
130 Step of comparison and return results
251 secured areas
252 Car
253 web services
400 identity verification request
410 financial transaction information or data
420 financial transaction information
430 Message
431 schematic form of the biometric attribute
440 thin frame
480 transaction execution details

The invention claimed is:

1. A method for verifying the identity of an individual with a mobile device equipped with at least one camera, a graphical display, a wireless communication adapter, and a verification mobile application, comprising the steps of:
 capturing a video of a biometric attribute of the individual through said camera of said mobile device during a self-scanning movement executed by said individual which provides a relative movement of said mobile device with respect to said biometric attribute during the capture of the video;
 reconstructing with said mobile device in real-time a 3D model of the individual's biometric attribute from the video captured, where the 3D model contains shapes and/or textures, forming thereby within said mobile device (20) a reconstructed 3D model;
 comparing said reconstructed 3D model with a reference 3D model of said biometric attribute of the same individual, this reference 3D model containing shapes and/or textures, stored in either said mobile device or a remote enrolment database following a previous enrolment phase of said individual with said mobile device, thereby providing a detailed comparison result;

detecting inadequate video capture situations by analysing luminance in the very first video frames captured by said camera of the mobile device, and giving a feedback information to the mobile device through said verification mobile application.

2. The method of claim 1, wherein said enrolment phase of said individual comprises the steps of:

checking the individual's identity by an enrolment agent, activating the verification mobile application of said individual's mobile device, capturing with said mobile device a video where the individual is panning the mobile device around the biometric attribute and/or making a self-scanning movement with the corresponding limb in front of the mobile camera, reconstructing with said mobile device in real time from said captured video a reference 3D model with shapes and/or textures of the biometric attribute, creating thereby within said mobile device a reference 3D model of said selected biometric attribute of the individual, and storing said reference 3D model in either said mobile device or remote database.

3. The method of claim 2, further comprising during the enrolment phase:

the step of proposing a plurality of biometric attributes which can be selected by the individual for identity verification purposes in accordance with his own privacy criteria, the steps of selecting one or more biometric attributes the individual agrees to use for identity verification and capturing a video for each selected biometric attribute, creating thereby reference 3D models of said selected biometric attributes of the individual.

4. The method of claim 3, wherein said mobile device is equipped with a front camera and a rear camera, wherein at least two biometric attributes are selected and wherein the front camera is used to capture a video of the individual's face as biometric attribute or part of the face as biometric sub-attribute determined by an identity verification server, the rear camera is used to self-scan another biometric attribute or other biometric attributes.

5. The method of claim 2, further comprising:

the step of supervising the enrolment phase of the individual by an authorized agent which can directly and remotely monitor the individual actions on his mobile device by establishing a video communication and where the authorized agent can give self-scanning instructions and recommendations to the individual to execute a panning movement of his biometric attribute (s) in front of the mobile camera, and the step of establishing a secure communication during the enrolment phase, between the individual's mobile device and the authorized agent's desktop through an identity verification server, and during any identity verification phase, between the individual's mobile device and an identity verification server equipped with said enrolment database.

6. The method of claim 5, further comprising:

the step of creating an account in the enrolment database with:

a unique mobile identifier used to open a secure communication path between the individual's mobile device and said identity verification server, and a unique user alias identifier which is used to open a secure communication path between an originator transaction server and the identity verification server, which unique alias identifier is totally independent from the unique mobile identifier for security reasons.

7. The method of claim 6 further comprising the step of using said unique mobile identifier to notify a presence awareness of the verification mobile application to the identity verification server, said identity verification server being able to wake-up and immediately notify the verification mobile application that an identity verification request occurred, and detect the mobile verification application is offline and notify the originator transaction server the individual needs to launch or install the mobile verification application by sending a message to the mobile device.

8. The method of claim 6, further comprising the steps of:

modifying said account in said enrolment database when the individual is replacing his mobile device by a new one, said identity verification server deleting or archiving the previous unique identifier and 3D model data, and creating a new unique mobile identifier when the individual is registering a new mobile device, the individual being required to self-scan his biometric attributes again to record new reference 3D models in either said mobile device or said enrolment database.

9. The method of claim 1, wherein said individual's biometric attribute is defined by biometric and/or non-biometric sub-attributes, and wherein said detailed comparison result comprise a plurality of detailed matching scores corresponding to the shape and/or to the texture of the reconstructed biometric and/or non-biometric sub-attributes with respect to the reference 3D model part of the same biometric and/or non-biometric sub-attributes, each matching score including a rating score for the matching between the shape of the reconstructed biometric and/or non-biometric sub-attributes with respect to the shape of the reference 3D model part of the same biometric and/or non-biometric sub-attributes and/or a rating score for the matching between the texture of the reconstructed biometric and/or non-biometric sub-attributes with respect to the texture of the reference 3D model part of the same biometric and/or non-biometric sub-attributes.

10. The method of claim 1, wherein before capturing a video of a biometric attribute, it further comprises the step of proposing to the individual a self-scanning methodology with no imposed gestures or facial expressions, comprising a panning movement of said mobile device around the biometric attribute with six degrees of freedom and/or a panning movement with six degrees of freedom of the biometric attribute in front of the mobile device.

11. The method of claim 1, further comprising:

the step of auto-adapting the reference 3D model by taking into account individual's appearance changes over the time by recording shapes and textures differences measured between the reference 3D model stored in said enrolment database and a selection of reconstructed 3D models.

12. The method of claim 1, further comprising the separate scanning with said mobile device of objects being worn by the individual as non-biometric sub-attributes, forming a reference 3D model of each non-biometric sub-attributes that can be superimposed to the reference 3D model of a corresponding biometric attribute captured during enrolment phase or updated after the enrolment phase, when making a reconstructed 3D model from the video captured during an identity verification phase.

13. The method of any of claim 1, further comprising a spoofing check by:
using the captured raw video of said biometric attribute or some fragments of the captured raw video and determining if the same scanning video sequence occurred in previously captured video of the same biometric attribute.

14. The method of claim 1, further comprising a spoofing check by:
during the comparison step between the reconstructed 3D model and the reference 3D model, recording the variance of the reconstructed 3D model within a predetermined range of time, where the variance for each shape and/or texture is computed and compared to a predetermined maximum acceptable magnitude range.

15. The method of claim 1, wherein said self-scanning movement is a panning movement of said mobile device with respect to said biometric attribute.

16. The method of claim 1, wherein said reconstructing step takes into account the mobile device CPU performance characteristics and a wireless connection bandwidth detected.

17. A system for verifying the identity of an individual comprising:
a mobile device equipped with at least one camera, a graphical display, a wireless communication adapter and a verification mobile application,
an originator transaction server, and
an identity verification server with a remote database,
said originator transaction server being able to send a verification request to said identity verification server,
said identity verification server being able to inform the individual about said verification request for the transaction identity verification server by means of the identity verification server sending a message to said individual's mobile device, and said mobile device being able to implement a verification method, by means of said verification mobile application, said verification method comprising the steps of:
capturing a video of a biometric attribute of the individual through said camera of said mobile device during a self-scanning movement executed by said individual which provides a relative movement of said mobile device with respect to said biometric attribute during the capture of the video;
reconstructing with said mobile device in real-time a 3D model of the individual's biometric attribute from the video captured, where the 3D model contains shapes and/or textures, forming thereby within said mobile device a reconstructed 3D model;
comparing said reconstructed 3D model with a reference 3D model of said biometric attribute of the same individual, this reference 3D model containing shapes and/or textures, stored in either said mobile device or said remote database following a previous enrolment phase of said individual with said mobile device, thereby providing a detailed comparison result;
detecting inadequate video capture situations by analysing the luminance in the very first video frames captured by said camera of the mobile device, and giving a feedback information to the mobile device through said verification mobile application.

18. The system of claim 17, further comprising:
a software mechanism which allows for the originator transaction server to display information or interact with the individual in a confidential way through the verification mobile application, where neither the verification mobile application nor the identity verification server can get an access to the contents of the information sent by the originator transaction server.

19. A method for protecting a transaction for an originator transaction service by implementing a biometric recognition of an individual through his personal mobile device equipped with a verification mobile application and at least one camera, using reference 3D model stored either in said mobile device or in a remote database, including the following steps:
sending a verification request from said originator transaction service to an identity verification server,
establishing a secure communication session between the verification mobile application of the individual's mobile device and the identity verification server,
informing the individual about said verification request for the transaction by means of the identity verification server sending a message to said individual's mobile device,
implementing with said individual's mobile device a method for verifying the identity of an individual comprising the steps of:
capturing a video of a biometric attribute of the individual through said camera of said mobile device during a self-scanning movement executed by said individual which provides a relative movement of said mobile device with respect to said biometric attribute during the capture of the video;
reconstructing with said mobile device in real-time a 3D model of the individual's biometric attribute from the video captured, where the 3D model contains shapes and/or textures, forming thereby within said mobile device (20) a reconstructed 3D model;
comparing said reconstructed 3D model with a reference 3D model of said biometric attribute of the same individual, this reference 3D model containing shapes and/or textures, stored in either said mobile device or in said remote database following a previous enrolment phase of said individual with said mobile device, thereby providing a detailed comparison result,
sending the 3D models detailed comparison result to the originator transaction service which requested an identity verification of the individual to perform a transaction, and
receiving a reply from originator transaction service either approval to execute the transaction or rejecting to execute the transaction or requesting to implement again with said individual's mobile device said method for verifying the identity of an individual with the same or a different biometric attribute;
detecting inadequate video capture situations by analysing the luminance in the very first video frames captured by said camera of the mobile device, and giving a feedback information to the mobile device through said verification mobile application.

* * * * *